US012301944B2

(12) United States Patent
Lawless-DesJardins et al.

(10) Patent No.: US 12,301,944 B2
(45) Date of Patent: May 13, 2025

(54) SYSTEM AND METHOD FOR CONTINUOUS PLAY QUANTIFICATION

(71) Applicant: iSpot.tv, Inc., Bellevue, WA (US)

(72) Inventors: Nicole Lawless-DesJardins, Portland, OR (US); Sean Muller, Bellevue, WA (US); Michael Bardaro, Snoqualmie, WA (US); Marc Boyer, Bellevue, WA (US)

(73) Assignee: iSpot.tv, Inc., Bellevue, WA (US)

( * ) Notice: Subject to any disclaimer, the term of this patent is extended or adjusted under 35 U.S.C. 154(b) by 0 days.

(21) Appl. No.: 18/377,224

(22) Filed: Oct. 5, 2023

(65) Prior Publication Data
US 2024/0129588 A1    Apr. 18, 2024

Related U.S. Application Data

(60) Provisional application No. 63/416,383, filed on Oct. 14, 2022.

(51) Int. Cl.
*H04N 21/475*  (2011.01)
*H04N 21/45*   (2011.01)
*H04N 21/472*  (2011.01)

(52) U.S. Cl.
CPC ..... *H04N 21/4756* (2013.01); *H04N 21/4532* (2013.01); *H04N 21/47217* (2013.01)

(58) Field of Classification Search
CPC .................................................. H04N 21/4532
See application file for complete search history.

(56) References Cited

U.S. PATENT DOCUMENTS

| | | | |
|---|---|---|---|
| 8,180,667 B1* | 5/2012 | Baluja | H04N 21/2743 705/14.19 |
| 9,420,338 B1* | 8/2016 | Vassigh | H04N 21/433 |
| 2016/0104207 A1* | 4/2016 | Zhao | G06Q 30/0275 705/14.71 |
| 2022/0256218 A1* | 8/2022 | Grover | H04N 21/43615 |

* cited by examiner

*Primary Examiner* — Michael B. Pierorazio
(74) *Attorney, Agent, or Firm* — Kory D. Christensen

(57) ABSTRACT

A computer-implemented method is provided in an exemplary embodiment and may include receiving a device status feed and receiving a content impression feed via a processor. The device status feed includes device status elements associated with a display device and the content impression feed includes content impression elements associated with a content impression of a tracked content. The computer-implemented method further includes matching, via the processor, the content impression to the display device by identifiers in the device status feed and the content impression feed. The computer-implemented method further includes detecting, via the processor, a continuous play event in response to the display device being powered off or not tuned to the input connected to the content player device at or near the time associated with the content impression.

19 Claims, 11 Drawing Sheets

| event_timestamp | event_id | platform | publisher | advertiser_id | campaign_id | placement_id | creative_id | identifier |
|---|---|---|---|---|---|---|---|---|
| 41:44.0 | 290893283222238112 | Phone | publisher #1 | 5813879034976000000 | 5857300549346680000 | 5802718391211620000 | 5900563258448913000 | |
| 11:47.0 | 133687387321367 | PC | publisher #2 | 821997173835900 | 5777898701404683000 | 5884426942294824000 | 5846147101263520000 | |
| 10:08.0 | 327934056623486 | TV | publisher #3 | 474132137637 | 5890248925180501000 | 5862961759372600000 | 5802564665751160000 | |
| 49:17.0 | 695266384229836 | TV | publisher #4 | 307249391880 | 5833161328055900000 | 5979417859345968000 | 5782931621758710000 | |
| 48:43.0 | 243813094886443 | TV | publisher #5 | 5864145977102340000 | 5897564457012070000 | 5878451699502540000 | 5929142224997820000 | |
| 46:05.0 | 159088794404039 | TV | publisher #6 | 474132137637 | 5836274341713030000 | 5865358916962330000 | 5843649414905160000 | |
| 36:09.0 | 206226686840963 | TV | publisher #7 | 821997173835900 | 5863641057033638000 | 5959893169623330000 | 5900563258448916000 | 38777737937933320 |
| 48:24.0 | 835739919768074 | TV | publisher #8 | 821997173835900 | 5890248925103501000 | 5954099241405440000 | 5902254513515980000 | |
| 19:33.0 | 161357909912593 | TV | publisher #9 | 474132137637 | 5890248925103501000 | 5829617593725800000 | 5802564665751190000 | |
| 41:01.0 | 998916324037733 | phone | publisher #10 | 821997173835900 | 5777898701404683000 | 5871730216948330000 | 5846147101263520000 | 36727032956217 |

| identifier | tag_uuid | site_id | device_mak | device_model | raw_process_timestamp_utc | event_date_utc |
|---|---|---|---|---|---|---|
| | ffecf32236cb45ee685489a158826bd3d | TC-3673-2 | Generic | Android 4.0 | 20:19.0 | 6/1/2023 |
| | 6f9a705c13b4d9b90badc35d4099fc2 | TC-3673-2 | Google | Chrome | 20:19.0 | 6/1/2023 |
| | 848a771ef2d94f2faaa442802a52928 | TC-3673-2 | VIZIO | SMARTCAST | 20:19.0 | 6/1/2023 |
| | f5644e4c1a2fe4023ac388036d35a941af | TC-3673-2 | VIZIO | SMARTCAST | 20:19.0 | 6/1/2023 |
| | f6d0414a2c3c54eb18ad3c952d09eb1f2 | TC-3673-2 | AMAZON | AFTDCT31 | 20:19.0 | 6/1/2023 |
| | ee55738cab6742aa97859cd69ec8adfc | TC-3673-2 | PHILIPS | 8000X | 20:19.0 | 6/1/2023 |
| 38777737937933320 | 9fb354914e5b46ed9f4102ae2290f04 | TC-3673-2 | AMAZON | AFTSS | 20:19.0 | 6/1/2023 |
| 36727032956217 | 235f148ab27d4adaa1c9c8c15c0c73e67 | TC-3673-2 | Generic | SmartTV | 20:19.0 | 6/1/2023 |
| | 4133edbeffc59d4b3ba11ef8c8b9cf36f3 | TC-3673-2 | Insignia | AFTJMST12 | 20:19.0 | 6/1/2023 |
| | 86cd1938ad64245518088bce4491d0297 | TC-3673-2 | UNKNOWN | GENERIC ANDROID | 20:19.0 | 6/1/2023 |

FIG. 2B

SYSTEM AND METHOD FOR CONTINUOUS PLAY QUANTIFICATION

CROSS-REFERENCE TO RELATED APPLICATIONS

This application claims the benefit of U.S. Provisional Application No. 63/416,383, filed Oct. 14, 2022, for "SYSTEM AND METHOD FOR CONTINUOUS PLAY QUANTIFICATION," which is incorporated herein by reference in its entirety. This application is related to U.S. application Ser. No. 16/036,312, for "Measurement of Television Advertisement Effectiveness," filed Jul. 16, 2018, now U.S. Pat. No. 10,721,541, which is also incorporated herein by reference.

TECHNICAL FIELD

This disclosure relates to connected televisions and, more particularly, to systems and methods for quantifying continuous play events for connected televisions.

BACKGROUND

Due to the ease in accessibility of content over the Internet and the growing popularity of media content streaming platforms, there is a gradual shift in the content consumption habits of users streaming content on display devices, such as televisions (TVs). As a result, the number of users requiring cable or satellite TV connection has plummeted over the years. Recently, TV industry has witnessed a transition in households from traditional TVs to connected TVs (CTV) owing to the flexibility that CTV offers to its users for streaming content via the Internet. With the boom in CTV viewership, content publishers have an enormous opportunity to reach more users for promoting their content. However, there remains a need to precisely measure or quantify results of CTV campaigns and the impact that they would likely produce on the targeted audience.

A particular problem faced by content publishers is a continuous play event, which occurs when content that is tracked for viewership (referred to herein as "tracked content") is delivered by a content player device to a CTV that is either turned off or tuned to a different input port than the input port to which the content player device is connected. A content impression, i.e., an instance of the tracked content being viewed, may be counted by the content player device, even though it impossible for the user of the CTV to have seen the content, resulting in inaccurate viewership statistics.

SUMMARY OF THE DISCLOSURE

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one aspect, a computer-implemented method includes receiving, via a processor, a device status feed including at least one of a power status indicating whether a display device is powered on or an active input status indicating whether the display device is tuned into an input connected to a content player device, a time associated with the at least one of the power status or the active input status, and an identifier associated with the display device. The computer-implemented method also includes receiving, via the processor, a content impression feed including a time associated with a content impression indicating when tracked content has been played and an identifier associated with the content impression. The computer-implemented method further includes matching, via the processor, the content impression to the display device by the identifiers in the device status feed and the content impression feed, as well as detecting, via the processor, a continuous play event in response, at least in part, to the display device being powered off according to the power status or not tuned to the input connected to the content player device according to the active input status at or near the time associated with the content impression.

In one example, the method further includes reporting, via the processor, the continuous play event.

In another example, the computer-implemented method further includes receiving, via the processor, device status feeds for a plurality of display devices, receiving, via the processor, content impression feeds for a plurality of content impressions, detecting, via the processor, continuous play events for at least a subset of the plurality of display devices and plurality of content impressions, and reporting, via the processor, statistics for the detected continuous play events.

In still another example, the statistics include at least one of a percentage of content impressions in which the display device was turned off, a total number of content impressions in which the display device was turned off, a percentage of content impressions in which the display device was not tuned to the input connected to the content player device, or a total number of content impressions in which the display device was turned off.

In yet another example, each content impression has a particular publisher, and the statistics are reported on a per publisher basis.

In an additional example, each content impression is part of a particular campaign, and the statistics are reported on a per campaign basis.

In still another example, the content impression is generated in response to rendering a reference embedded in the tracked content played by the content player device.

In yet another example, the reference comprises an invisible image.

In a further example, the time associated with the power status or the time associated with the active input status corresponds to a particular time range, such that a continuous play event is detected in response, at least in part, to the display device being powered off according to the power status or not tuned to the input connected to the content player device according to the active input status within the particular time range.

In a still further example, the content impression feed further includes a user agent, and the continuous play event is detected, at least in part, in response to the content player device having a user agent that corresponds to the user agent in the content impression feed.

In another aspect, a system includes a processor, a network interface, and a memory including program code that, when executed by the processor, causes the processor to perform operations. The operations include receiving, through the network interface, a device status feed including at least one of a power status indicating whether a display device is powered on or an active input status indicating whether the display device is tuned into an input connected to a content player device, a time associated with the at least one of the power status or the active input status, and an identifier associated with the display device. The operations further include receiving, through the network interface, a content impression feed including a time associated with a content impression indicating when tracked content has been played and an identifier associated with the content impression. The operations also include matching the content impression to the display device by the identifiers in the device status feed and the content impression feed and detecting a continuous play event in response, at least in part, to the display device being powered off according to the power status or not tuned to the input connected to the content player device according to the active input status at or near the time associated with the content impression.

In yet another aspect, a non-transitory computer readable medium comprising program code that, when executed by a processor, performs the operations discussed above.

BRIEF DESCRIPTION OF THE DRAWINGS

The accompanying Figures and Examples are provided by way of illustration and not by way of limitation. The foregoing aspects and other features of the disclosure are explained in the following description, taken in connection with the accompanying example figures relating to one or more embodiments, in which:

FIG. 2B illustrates a content impression feed, according to an embodiment of the present disclosure.

DETAILED DESCRIPTION

Figure 1:
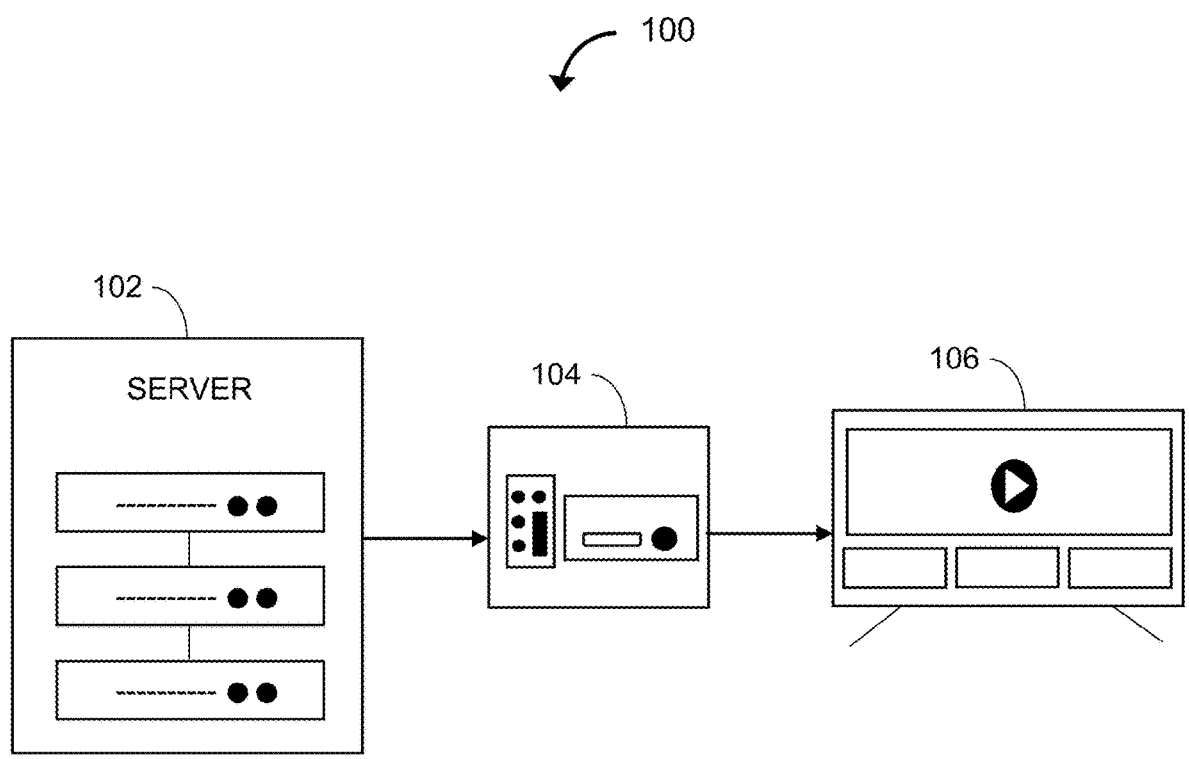
FIG. 1 illustrates a block diagram of a system environment for delivery of content on a display device, according to an embodiment of the present disclosure.

For the purposes of promoting an understanding of the principles of the present disclosure, reference will now be made to various embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

The present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

A connected television or CTV refers to any television set that is used for streaming media content over the Internet. The content may include, but is not limited to, audio, video, or a combination thereof. Over-the-top (OTT) content is any content streamed to a CTV. With OTT content gaining popularity, OTT subscribers are rapidly increasing owing to the easy accessibility of OTT streaming services. The users may stream content on the television through various OTT platforms and OTT applications. To stream content on the CTV, the users may use external streaming devices or connected devices, referred to herein as "content player devices," that are connected to the television via an audio/video interface, such as an HDMI port. Exemplary content player devices are available from Amazon® and Apple®. These devices are also referred to as OTT devices that enable the usage of the OTT applications and content streaming on the television via the Internet.

With the growing number of cord-cutters i.e., users who no longer pay for traditional cable or satellite subscriptions, and a simultaneous increase in CTV and OTT viewership, various types of content are played on the television using the content player device. The content may include, but is not limited to, advertisements or ads, hereinafter referred to as "tracked content," as well as traditional streaming content (e.g., movies, television programs) related to OTT streaming platforms, channels, and the like. The tracked content may be played independently and/or along with the traditional content on the television. However, content of both types sometimes continues to play on the content player device after viewers or users turn off their CTV or when the CTV is tuned to a different HDMI port than the HDMI port to which the content player device is connected. This situation is referred to as a "continuous play" event, which typically results in audience overcounts, since the content player device may record a "content impression" for tracked content that could not have been seen by a user.

One approach to addressing potential audience overcounts includes implementing "Are you still watching" prompts or similar end cards on the television screen. This approach is implemented by a publisher of streaming services to seek manual confirmation from the viewers via prompts if they are still watching the content displayed on the television screen. However, to avoid obtrusiveness, such prompts are typically displayed at intervals ranging from an hour to two hours (or more) and do not provide the publisher with viewership information of sufficient granularity, resulting in likely overcounts.

The embodiments of the present disclosure aim to address the above-stated problem by detecting continuous play events when the display device is powered off or not tuned to the input connected to the content player device. Specifically, the tracked content that was not viewable on the television screen by the users is identified and the actual number of content impressions associated with the tracked content are measured.

FIG. 1 illustrates a block diagram of a system environment 100 for delivery of content on a display device, according to an embodiment of the present disclosure. The system environment 100 comprises a server 102, a content player device 104, and a display device 106 (e.g., television). Each of the components depicted in the system environment 100 may communicate over any type of appropriate communication network, but for the sake of better understanding, each of the components is connected to the Internet, which enables the communication between each of the components.

The server 102 includes suitable hardware, software, firmware, or combinations of hardware, software, and/or firmware for storage and delivery of media content. Particularly, the server 102 may be capable of hosting, optimizing, and distributing media content including the tracked content across various media platforms and applications. The server 102 may be operated by an organization that identifies space for promoting one or more products of one or more brands. Accordingly, the server 102 may be associated with multiple publishers and multiple brand promoters and manage media content associated with each publisher and brand promoter. The media content stored in the server 102 is accessed by the content player device 104 for streaming and delivery of the tracked content on the display device 106. In an embodiment, the server 102 may be capable of tracking analytics or parameters related to the tracked content. For the sake of brevity and a better understanding of the present disclosure, a media content server associated with the tracked content may be considered as a non-limiting example of the server 102.

The content player device 104 is any external device that is connected to the display device 106 via an input and is used to stream content over a communication network, such as the Internet, on the display device 106. In an embodiment, the content player device 104 may be connected to the display device 106 via a High-Definition Multimedia Interface (HDMI) cable and HDMI input but may be connected via any audio/video interface that transfers audio/video from a source to a display device without limitation. Examples of the content player device 104 may include, but are not limited to, Amazon® Fire Stick®, AppleTV® media device, Google TV® media device, Chromecast®, a gaming console (e.g., Xbox®, PlayStation®, Nintendo Switch®, and the like), Internet-enabled Blu-Ray player, or any Internet-connected device. In an embodiment, the content player device 104 may include a set-top box (STB) and a hand-held controller to navigate the streamed content being displayed on the display device 106 to which the content player device 104 is connected.

The display device 106 includes suitable hardware, software, firmware, or combinations of hardware, software, and/or firmware to display, on a display screen, content streamed through the connected content player device 104. Examples of the display device 106 may include but are not limited to a television, a monitor with a suitable audio/video interface, such as an HDMI port, or any display device with functionality to plug in a streaming device, such as the content player device 104. For the sake of brevity and a better understanding of the present disclosure, the display device 106 may correspond to a CTV that is connected to the content player device 104.

A user watches content on the display screen of the display device 106 while the content is being streamed by the content player device 104 connected as an input to the display device 106 through, e.g., the HDMI cable and HDMI port. The content viewable on the display screen includes content pertaining to various multimedia platforms and/or channels available on various applications provided by the content player device 104, and the tracked content accessible from the server 102. As the content player device 104 streams the content, there are instances when the tracked content served by the content player device 104 may play on the display device 106 when the display device 106 is turned off or inactive. This occurs because when the display device 106 is in a power-off state, a low-power (sleep) state, etc. The display device 106 may not always send a signal to the content player device 104 connected to the display device 106 through its HDMI port indicating that the display device 106 has been turned off. As a result, the content player device 104 continues to play the tracked content unless the user exited or paused the streaming application that the user was watching before turning off the display device 106.

Further, the content player device 104 may continue streaming content when an input of the display device 106 is switched from one input to another. As a non-limiting example, for the sake of explanation, the content may be streamed on the display device 106, such as a CTV, through the content player device 104, such as an Amazon® Fire Stick®, and the user may change the current input to a gaming console input, such as an Xbox®. However, the Amazon® Fire Stick® may continue to play the content including the tracked content regardless of the change in the input. In such a scenario, the tracked content may be missed by the viewer and be incorrectly counted by the content provider as being seen by the viewer.

In both the above-discussed scenarios, the content player device 104 continues to serve the tracked content even when the display device 106 is turned off or switches to another input. Such an issue of continuous play by the content player device 104 accounts for inaccurate views being counted for the user with respect to watching the tracked content on the display device 106 that displays content streamed through the content player device 104. In fact, the analytics or parameters generated in relation to the tracked content will be misleading for the brand promoters and/or publishers associated with the tracked content, who may have to pay for advertising that cannot be seen by a user.

Hence, the solutions disclosed herein quantify the problems or issues discussed above. In particular, the solutions cater to detecting the occurrence of the problem for every brand promoter, every campaign, every publisher, and every hardware streaming device or content player device manufacturer.

Figure 2A:
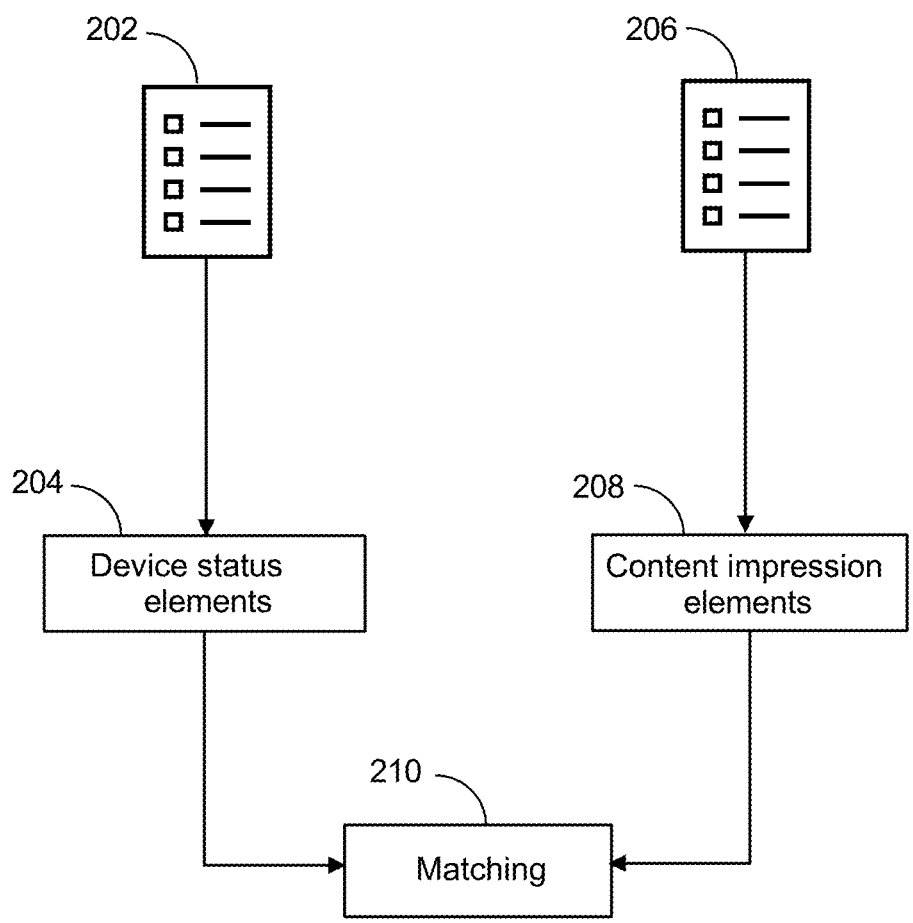
FIG. 2A illustrates a schematic representation of different feeds used for analysis in detection of continuous play events, according to an embodiment of the present disclosure.

FIG. 2A is a schematic representation of different feeds used for analysis in detection of continuous play events in conjunction with components of FIG. 1. As depicted in FIG. 2A, a device status feed 202 is analyzed to identify device status elements 204, and a content impression feed 206 is analyzed to identify content impression elements 204.

The device status feed 202 corresponds to an activity feed of a display device, such as the display device 106, which may be a CTV. The device status feed 202 may include an identifier associated with the display device 106. As a non-limiting example, the identifier may correspond to an IP address of the display device 106. The device status feed 202 may further include a power state of the display device 106, i.e., whether the display device 106 is in a powered on state, a powered off state, or a sleep state, etc., as well as the time(s) at which the display device 106 is in each state or transitions between states.

The device status feed 202 may further indicate which HDMI (or other) input is active on the display device 106 and what time(s) the display device 106 is using a particular input or transitions between inputs. The aforementioned times can be represented by time stamps, which may be broadly construed to include a time and/or date of a particular event. Time stamps may be in coordinated universal time (referred to by the acronym UTC) and/or other timing schemes.

In an embodiment, the device status feed 202 may further include Automatic Content Recognition (ACR) data, which is typically device-level data that captures the content that is running on a display screen of the display device 106 based on ACR chipset embedded in the display device 106. There may be scenarios where ACR functionality of the display device 106 is turned off. For example, a native application running on the display device 106 may not allow automatic content recognition and the manufacturer of the display device 106 may be contractually obligated to turn off the ACR functionality. In other scenarios, the ACR functionality may not be available in a catalog of the display device 106. In either of these scenarios, the ACR device-level data may not be received. However, regardless of whether the ACR is turned on or off or unavailable, the device status feed 202 would still provide information related to the power status of the display device 106, the active input status of the display device 106, and that a certain piece of (unrecognized) content (traditional content or tracked content) is being watched at a specific input along with the timestamps. Therefore, the device status feed 202 is analyzed to identify a time instance or duration when the display device 106 drops out of the device status feed 202 and accordingly facilitates a determination that the display device 106 was turned off for a certain duration based on the analysis.

In some embodiments, data for the device status feed 202 for a particular CTV may be generated, at least in part, by the ACR functionality of the CTV.

Device status feeds 202 of the type described above may be supplied, for example, by Inscape Data Services, a division of Vizio, Inc. of Costa Mesa, CA. However, the present disclosure is not limited to a particular source of the device status feed 202 and may be generated or received from any other feed source and/or multiple feed sources, internal or external to the display device 106.

Therefore, the information accessed from the device status feed 202 leads to determining the device status elements 204 of a display device (e.g., CTV). The device status elements 204 may include one or more of: the identifier associated with the display device 106, the power state of the display device 106, the active input status (i.e., which input of the display device 106 is currently being monitored for display on the display device 106), and any timestamp(s) associated with each of the above (e.g., the time(s) at which the power was turned off/on, the time(s) at which an input was changed, etc.).

The content impression feed 206 is typically a time stamped feed of content impressions, i.e., it includes a time associated with a content impression indicating when the tracked content has been played on a display device, such as the display device 106 which may be a CTV. The content impression feed 206 may also include an identifier associated with the content impression (e.g., an IP address associated with the content impression), a delivery device user agent (e.g., the make, model, and/or operating system of the delivery device), and various metadata (e.g., the OTT service that delivered the impression, details about the tracked content, etc.) associated with the tracked content or promoter of the tracked content. In particular, the content impression feed 206 may indicate a connected device, such as a type of the content player device 104 on which the impression was played (e.g., Amazon® Fire Stick®). Each content impression may be associated with a particular publisher and may be a part of a particular campaign. It shall be noted that content impression feeds 206 for a plurality of content impressions may be received or accessed without limitations.

In an embodiment, the content impression feed 206 may correspond to OTT pixel impressions that may be measured through direct Server to Server (S2S) and pixel integrations with one or more Demand-Side Platforms (DSPs) and publishers. As an example, a tag may be uniquely associated with the tracked content, and the tag may correspond to a reference, such as, but not limited to an invisible image or file. The invisible image or file may include a 1×1 pixel image (e.g., GIF) file that fires when the tracked content is played, although, in some embodiments, an image file may not be used. An example of the foregoing is an iSpot® Pixel®, used by iSpot.tv, Inc., of Bellevue, WA, in connection with its Unified Measurement product. A content impression may be generated in response to rendering the file that is embedded in the tracked content which may be played by the content player device 104. The pixel integration delivers information, such as, but not limited, to the time and/or date at which the pixel was fired (e.g., time stamp), specifics of the pixel that was fired (e.g., the URL on which it was placed), a brand promoter and/or publisher that the tracked content relates to, a streaming service on which the tracked content was played, a type of device on which the tracked content was delivered (e.g., Amazon® Fire Stick®), and the like. The content impression feed 206 may be utilized to validate the content impression to display device mapping. Although a specific implementation of generating and/or accessing the content impression feed 206 is disclosed above using pixel integration, however, any other techniques may be utilized to derive similar information.

In some embodiments, a publisher may send their own internal logs of tracked content delivery. These logs include the same information as obtained via the Pixel. In such a case, the publisher tracks content via their own, first party tracking methodology.

Content impression feeds 206 of the type described above may be provided by, for example, iSpot.TV, Inc. of Bellevue, WA. However, the present disclosure is not limited to a particular source of the content impression feed 206 and may be generated or received from any other feed source(s).

In view of the foregoing, the information accessed from the content impression feed 206 leads to determining the content impression elements 204 of a display device (e.g., CTV). The content impression elements 204 may include one or more of: timestamps associated with the content impression, the identifier associated with the content impression (e.g., IP address associated with the content impression), the delivery device user agent, the device on which the impression was played, and the metadata (e.g., the type of content tracked, the owner of the content, etc.)

As a non-limiting example, for the sake of understanding in simplistic terms, using the content impression feed 206, it may be determined that the tracked content was played at a specific date and/or time for a particular IP address, serving as an identifier, on a particular content player device. Further, using the device status feed 202, a matching 210 may be performed to check the specific date and/or time whether the display device 106 such as CTV was turned on and tuned to the correct input for the particular content player device. If it is determined that the CTV was in a power-off state or was tuned to an input other than the correct input, then that instance or impression of the tracked content would be marked as a continuous play event. In some embodiments, CTVs go into a "sleep" mode when the power button is pressed, which may also result in a continuous play event. The matching 210 may be performed by a server or other suitably equipped computing device.

In certain embodiments, the determined continuous play events may be counted and tracked for notifying the number of continuous play events to a publisher or brand promoter associated with the tracked content. In alternative embodiments, the determined continuous play events may be used for removing such instances or content impressions from overall statistics related to reporting the number of times the tracked content was actually watched on a display screen of the CTV by user(s).

Additionally, in some embodiments, the content impression feed 206 may include content impression logs from a specific entity for the detection of continuous play events. The content impression logs may be time stamped logs of content impressions and may include information regarding delivery device user agent and publisher of the tracked content.

FIG. 2B illustrates example fields within the content impression feed 206. In one embodiment, the content impression feed 206 includes an event timestamp 212, an event ID 214, a platform 216 (e.g., PC, TV, Phone), a publisher name 218, an advertiser ID, a campaign ID 222, a placement ID 224, a creative ID 226, an identifier 228, a log Universal Unique Identifier (UUID) 230, a site ID 232, a device maker 234, a device model 236, a raw process timestamp 238, an event date 240, and/or the like.

Once the content impression logs are mapped to a specific display device such as CTV, the logs may be utilized to provide information regarding where and how the content impression was delivered. Alternatively, in other embodiments, the content impression logs may be accessed and processed independently from the content impression feed 206.

Therefore, with reference to FIG. 2A, after analyzing the device status feed 202 and the content impression feed 206, the device status elements 204 and content impression elements 204 are determined, respectively.

Figure 3:
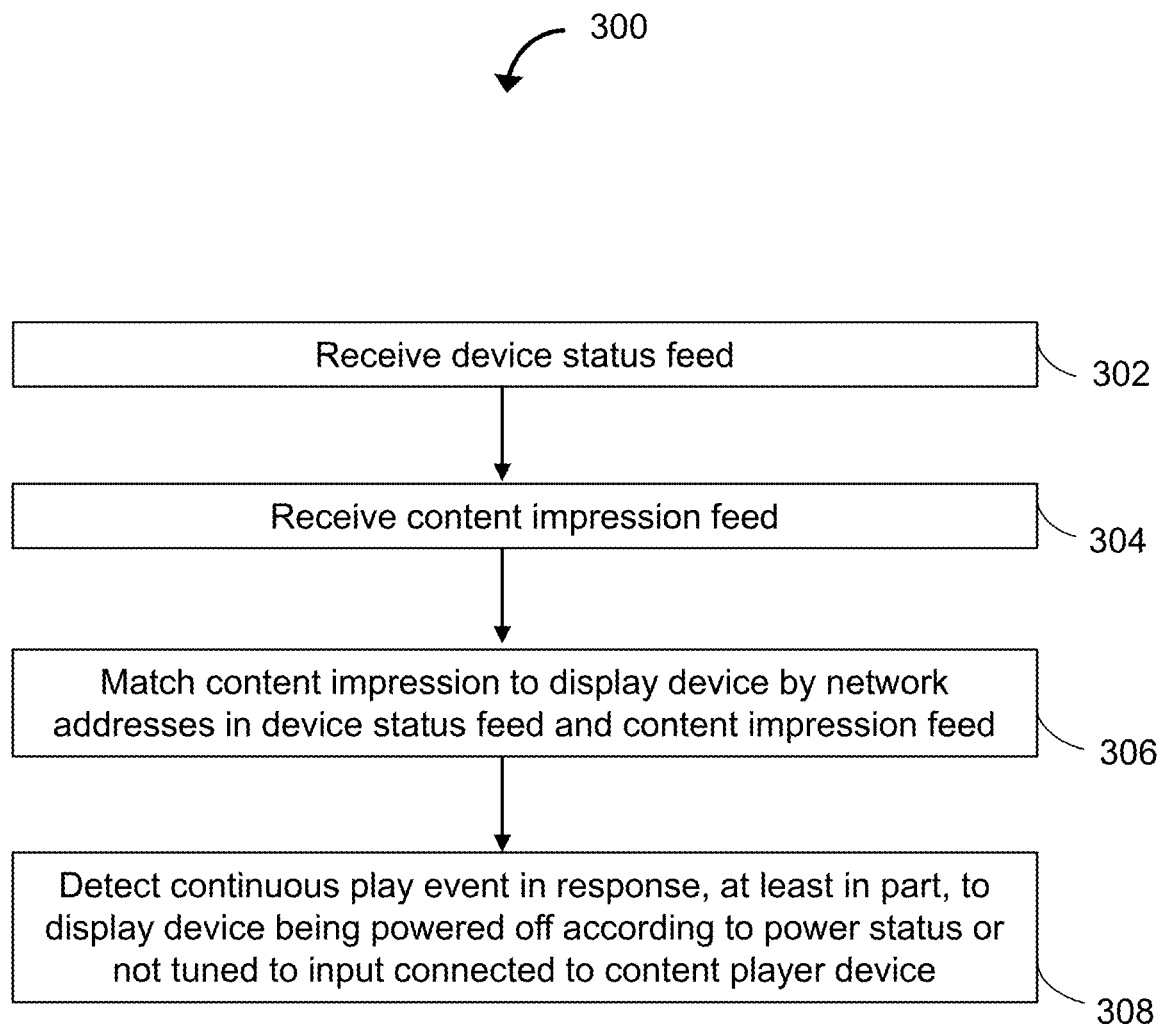
FIG. 3 is a flowchart of an example method for detecting a continuous play event, according to an embodiment of the present disclosure

FIG. 3 is a flowchart of an example a method 300 for detecting a continuous play event, according to an embodiment of the present disclosure. FIG. 3 will be explained in conjunction with previous figures. It should be understood that there can be additional, fewer, or alternative steps performed in similar or alternative orders, or in parallel, based on the various features and embodiments discussed herein unless otherwise stated.

The method 300 begins at block 302 where a device status feed (or the device status feed 202) is received via a processor (e.g., one or more processors of a computing platform). The device status feed 202 includes at least one of (1) a power status indicating whether a display device, such as the display device 106, is in a powered on, off, or sleep state, and (2) an active input status indicating whether the display device 106 is tuned into an input connected to a content player device, such as the content player device 104. The device status feed 202 may further include one or more of a time associated with the at least one of the power status or the active input status and an identifier (e.g., IP address) associated with the display device 106. In some embodiments, the device status feed 202 may include information about the program that was being watched at the time (e.g., name of the show/movie, an identifier for the program, which station it was playing on, scheduled start/end timestamps, and the like). It should be noted that any data feed providing the device status elements 204 such as the power status, the active input status, the identifier, and time associated with the power status and/or input status of the display device 106 may be utilized as the device status feed 202 for the purpose of continuous play event detection.

After receiving the device status feed 202, at block 304, a content impression feed (or the content impression feed 206) is received. The content impression feed 206 includes, without limitation, at least one of a time associated with a content impression indicating when tracked content has been played, an identifier associated with the content impression, and name or type of device on which the impression was played. As discussed previously with reference to FIG. 2A, any data feed that provides the content impression elements 204 such as the identifier associated with the content impression of the tracked content, timestamps related to the time at which the tracked content was played, and the device on which the impression was played may be utilized as the content impression feed 206 for the purpose of continuous play event detection.

Although the content impression feed 206 is indicated as being received at block 304 after receiving the device status feed 202 at block 302, those of skill in the art will recognize that the content impression feed 206 may be received before, after, or simultaneously with the device status feed 202 without departing from the scope of the present disclosure.

At block 306, the content impressions are matched to the display device 106 by the identifiers in the device status feed 202 and the content impression feed 206. As a non-limiting example, network or IP addresses associated with the display device 106 and the content impression may be utilized as the identifiers to perform the matching. However, there may be scenarios when the IP addresses may not be retrieved or available due to privacy restrictions. In such scenarios, as another non-limiting example, matching the device status feed 202 and the content impression feed 206 may be performed via a third-party that can provide a link when the identifier (such as IP address associated with the content impression) is not available. The link of the type described above may be provided by, for example, Experian, LiveRamp, and the like.

In certain embodiments, S2S integrations, which were previously described with reference to FIG. 2A, use matching via third-party DSPs without reliance on IP address associated with the device status feed 202 and the content impression feed 206 for matching. In some embodiments, DSPs may use IP addresses in their own matching along with other identifiers. Integration with a multitude of third-party identity graphs may enable identification and tracking of potential consumers of the tracked content. In particular, the identity graph solutions may be offered by data management platforms (DMPs) that generate and maintain a mapping of IDs of the display devices 106 to their proprietary mapping ID. Such third-party IDs may be leveraged by brand promoters as an alternative to using IP addresses as a link for the matching, as discussed above. In an embodiment, regular updates may be received by a source of the content impression feed 206, such as iSpot.TV, from DMPs that associate a DMP ID to each household in a predefined panel of display devices. Accordingly, for the purpose of continuous play event detection or CTV verification, usage logs that include the DMP ID may be received, and subsequently the OTT content impressions may be matched with the respective display device 106 based on a common DMP ID (e.g., LiveRamp ID). DMPs may operate coherently with DSPs to improve audience targeting and performance of brand promotions associated with the tracked content.

It shall be understood that the present disclosure is not limited to a particular third-party source for provisioning the identifier or link for matching the device status feed 202 and the content impression feed 206, and the identifier or link may be generated, obtained or received from any other source(s) alone or in combination. Additionally, any identity linker between the panel of display devices and data of interest may be utilized as the identifier(s) and the embodiments described herein are not limited to using DMP IDs for matching.

Further, in a scenario where device status feeds 202 for the plurality of display devices are received and content impression feeds 206 for the plurality of content impressions are received, then the content impressions are matched via the identifiers to display devices in the panel. In examples where an IP address is utilized as the identifier, it shall be noted that the display devices, such as televisions, with stable and unique IP addresses (as opposed to dynamic or temporary IP addresses) may be included for precise matching. An extensive matching may be performed to ensure that the publisher-reported content impressions were intended for the matched display device within the panel. Additionally, the data sources (device status feed 202 and content impression feed 206) described previously may be combined or matched based on timestamps and/or device ID. Accordingly, any content impression may be associated with an appropriate content event. In some embodiments, Media Access Control (MAC) addresses or the like may be used individually or in combination with other data as identifiers.

Without departing from the scope of the present disclosure, the matching described herein should not be interpreted as being limited to IP address of the display device 106 or CTV, rather one may utilize any identifier of the display device 106 or CTV that can be matched to connect the tracked content, either viewable or non-viewable, with the display device 106 or CTV the tracked content was run on.

In an embodiment, to obtain the sample set for performing the analysis using the device status feed 202 and the content impression feed 206, an initial step may be to filter out all the content impressions not tied to a TV set in a panel which includes panel data or device status feeds 202 of a plurality of display devices or TVs. Subsequently, the list of content impressions obtained as a result of the first step is further refined. As an exemplary embodiment, the CTV impressions for a specific brand promoter are received and matched to the panel. Accordingly, after processing the CTV impressions, Matched Households and Non-matched Households are identified. Matched Households correspond to all impressions delivered to a household that includes a TV in the panel based on identifier matching (such as IP address), while the Non-matched Households correspond to all impressions delivered to households that are not found in the panel. The sample set includes categories of Mobile and tablets, Native apps, and Filtered out impressions. The Mobiles and tablets category relates to all impressions delivered to non-TV devices in the Matched Household set, e.g., delivered to a phone or a tablet. The Native apps category relates to all impressions delivered to TV devices and played via the TV's native app. The Filtered-out impressions category relates to all impressions delivered to a CTV in the Matched Household that were filtered out because of conflicts, uncertainty, and conservative filtering rules that will be described in later paragraphs. The sample set relates to all impressions delivered to a CTV in the Matched Household that were not filtered out, and the sample set is used for analysis and reporting which will be explained in the subsequent paragraphs.

In order to arrive at more precise measurements, certain matching and processing rules may be applied which are described below in the context of a CTV associated with an X brand:

1) CTV impressions must be mapped to an X-recognized input device (e.g., Amazon® Fire Stick®) or an X TV. In a non-limiting example, if the content impression logs show that the content impression was delivered on an Amazon® Fire Stick®, one shall recognize via the HDMI input of the TV or CTV that it has an Amazon® Fire Stick® connected to it.
2) CTV impressions with unlikely publishers may be removed in some embodiments.
3) CTV impressions delivered to non-TV devices are removed.
4) At least one CTV impression may occur while the TV is on and set to the same input device. In one embodiment, a Smart TV input device may only be associated with a single OTT input device in a house (i.e., there cannot be multiple Amazon® Fire Sticks® in the house for Amazon® served impressions in this embodiment).

With respect to considering error margins and biases for performing the analysis as discussed above, expected ranges for devices, publishers, and device-publisher combinations may be developed with the following steps:

1) Determine the percentage of impressions logged while the TV was off each day.
2) Bias-correct by removing the observed non-delivered percentage for panel TVs for that day. If there are no errors, non-delivered impressions are expected to be zero when no input device is used (e.g., watching a native TV app).
3) Calculate an impression-weighted mean and standard deviation across the six-month period. Stability across a 6-month period validates that continuous play is a persistent issue.

Once the different data sources or feeds are matched or combined at block 306 in view of different factors and/or criteria as discussed above, a continuous play event is detected at block 308. The continuous play event may be detected in response to the display device 106 being powered off according to the power status. Alternatively or in addition, the continuous play event may be detected in response to the display device 106 being not tuned to the input connected to the content player device 104 according to the active input status at or near the time associated with the content impression. In scenarios where device status feeds 202 for the plurality of display devices are received and content impression feeds 206 for the plurality of content impressions are received, then continuous play events for at least a subset of the plurality of display devices and plurality of content impressions may be detected.

In an embodiment, the time associated with the power status or the time associated with the active input status in the device status feed 202 may correspond to a particular time range. Accordingly, a continuous play event may be detected in response, at least in part, to the display device 106 being powered off according to the power status or not tuned to the input connected to the content player device 104 according to the active input status within the particular time range. In another embodiment, when the content impression feed 206 includes the user agent, then the continuous play event is detected, at least in part, in response to the content player device 104 having a user agent that corresponds to the user agent in the content impression feed 206.

Accordingly, based on the sample set after matching and processing rules are applied, the percentage of delivered and non-delivered impressions is calculated as part of detecting the continuous play events and reported for each day and for each publisher and platform combination.

The disclosed method provides verification of incremental audience reach for each CTV publisher and verifies the percentage of streaming impressions that actually play on the display device 106 (such as a TV) that is powered on versus the percentage of streaming impressions that play on the TV that is powered off. The content impressions that are streamed by the content player device 104 on the display device 106 which is turned off are referred to herein as "non-viewable impressions" since the user could not view such content impressions on the display screen of the display device 106.

After the detection of continuous play event(s) or non-viewable impressions, the continuous play event(s) is/are reported via the processor. The reporting may be provided via a specific user interface (UI) and may include a breakdown of viewable vs. non-viewable impressions that can further be sorted by streaming devices, publishers, campaigns, or a combination thereof. The reporting may include reporting statistics for the detected continuous play event(s) that may include at least one of a percentage of content impressions in which the display device 106 was turned off, a total number of content impressions in which the display device 106 was turned off, a percentage of content impressions in which the display device 106 was not tuned to the input connected to the content player device 104, or a total number of content impressions in which the display device 106 was turned off. Additionally, or alternatively, the statistics may be reported on a per publisher basis and/or per campaign basis and/or per content player device 104.

The disclosed method further provides verification of impressions, reach, and frequency for a brand promoter's media investments in linear TV (e.g., cable TV), streaming platforms (e.g., CTV, OTT), addressable brand promotions, and other digital campaigns. The reporting may include deduplication (deduping) of audiences between linear and streaming publishers, including incremental and overlap reach and frequency verification. The reporting may further include co-viewing and person-level reporting against all traditional age and gender buckets or against households. The verification reporting may further be sortable and viewable by brand, campaign, etc., in the user interface (UI).

As an application area of the disclosed embodiments, any company that is relying on the tracked content for their brand promotion or is interested in measuring the impact of the tracked content across digital devices and audiences may utilize the embodiments disclosed herein to verify whether the tracked content is viewable on screen. Further, the disclosed embodiments also verify that the media content purchased by the company from streaming publishers is delivered in a way that is viewable on screen, which means that the source content that is being streamed to a connected device (e.g., the content player device 104) is also the viewable source on the screen it is connected to.

Figure 4A:
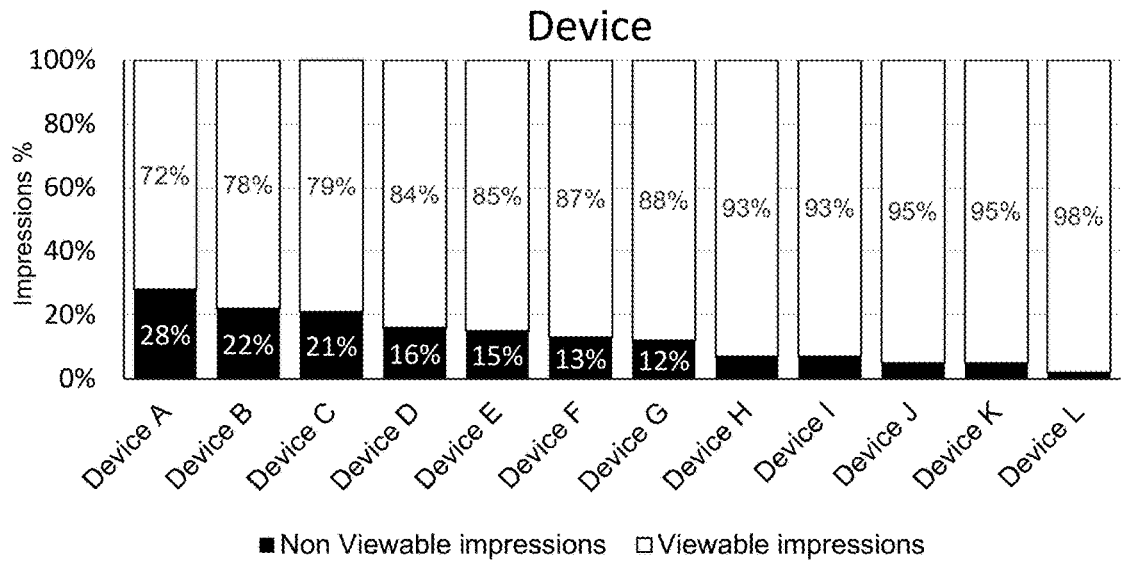
FIGS. 4A, 4B, and 4C depict reports generated and/or user interfaces as part of continuous play event detection, according to an embodiment of the present disclosure.
Figure 4B:
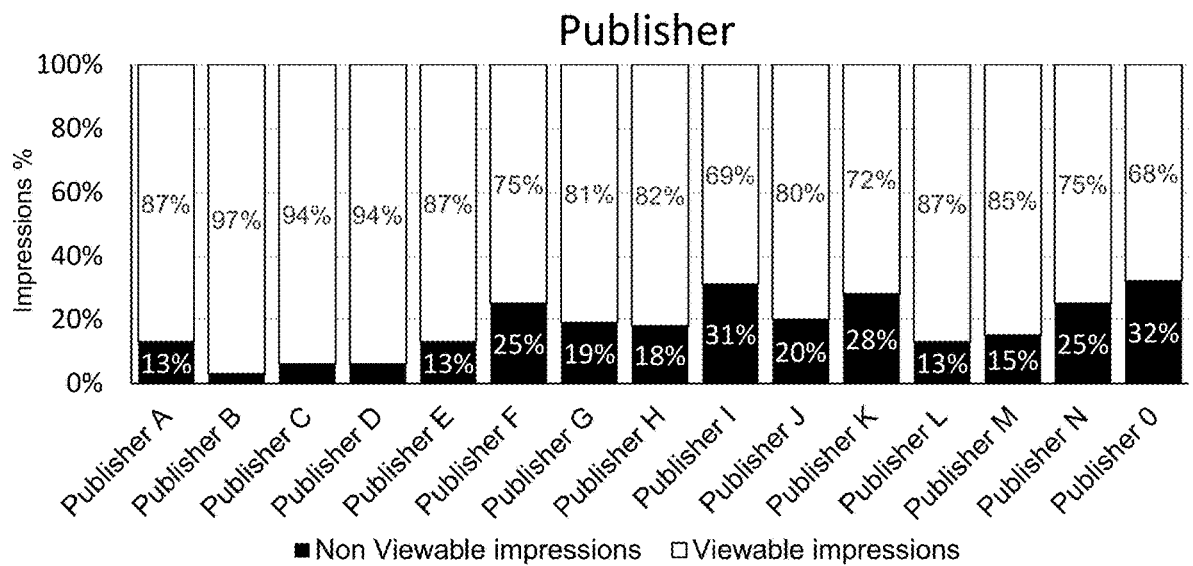
Figure 4C:
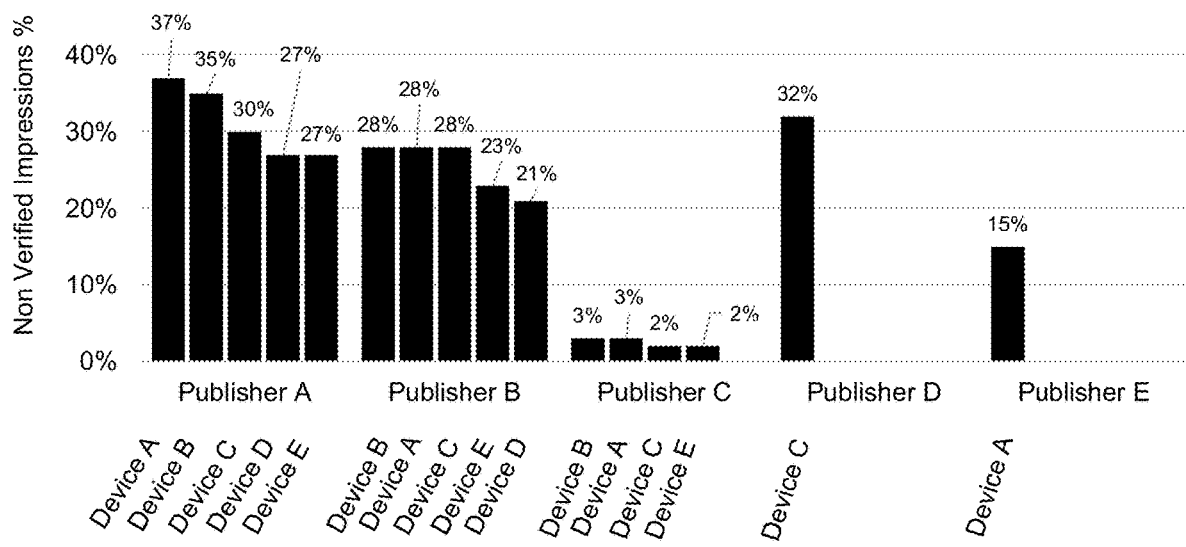

FIGS. 4A, 4B, and 4C depict exemplary reports and/or UIs that are generated as part of continuous play event detection, according to embodiments of the present disclosure. As discussed with reference to FIG. 3, reporting may be performed to indicate statistics including viewable vs. non-viewable impressions for a streaming device, also referred to herein as a connected device or content player device.

FIG. 4A depicts viewable vs. non-viewable content impressions for each of a plurality of device types (e.g., Device A through Device L) in an order of devices ranging from the highest percentage of non-viewable impressions (Device A with 28%) to the lowest percentage of non-viewable impressions (Device L with 2%). With reference to FIG. 4A, the structure of reporting or format of UI depicted aids in easy identification of the type of streaming devices (e.g., Amazon® Fire Stick, AppleTV® media device, Google TV® media device, Chromecast®, Xbox®, PlayStation®, Nintendo Switch®, etc.) and their respective performances with respect to the continuous play event detection. For example, 72% of content impressions are viewable while 28% of content impressions are non-viewable for device A depicted in FIG. 4A, and likewise percentages for each device are depicted. It should be understood that the report or UI illustrated in FIG. 4A is for exemplary purpose and any other format for conveying similar information may be utilized.

Similarly, FIG. 4B depicts viewable vs. non-viewable content impressions for each of a plurality of publishers (e.g., Publishers A-O). As shown in FIG. 4B, Publisher A has 13% non-viewable impressions while Publisher O has 32% non-viewable impressions. As a result, via the report or UI depicted in FIG. 4B, low-performing, stable performing, and high performing publishers may be identified in relation to promoting the tracked content. As a non-limiting example, percentages below 10% are not displayed in the reports or UIs depicted in FIGS. 4A and 4B, while the percentages above 10% are indicated for quick detectability and/or for gauging low-performing (i.e., having high incidence rate of non-viewable impressions) devices and publishers respectively with respect to the visibility of the tracked content. Although a percentage of 10% is considered as a reference for displaying the reports in FIGS. 4A and 4B, any threshold percentage (which may be user-defined) may be utilized for reporting the statistics related to continuous event play detection without limitation. It should be understood that the report or UI illustrated in FIG. 4B is for exemplary purpose and any other format for conveying similar information may be utilized.

FIG. 4C depicts another format of report or UI generated to convey statistics that include a combination of device and publisher percentages plotted against non-viewable impressions. In particular, FIG. 4C depicts the top five (or other number of) publishers segregated by device (i.e., streaming or connected device like the content player device 104). In other words, top publishers that account for maximum continuous play events are depicted. As shown in FIG. 4C, statistics for Publisher A are depicted with respect to five types of devices, i.e., Device A, Device B, Device C, Device D, and Device E. Device A includes 37% non-viewable content impressions, Device B includes 35% non-viewable content impressions, Device C includes 30% non-viewable content impressions, Device D includes 27% non-viewable content impressions, and Device E includes 27% non-viewable content impressions. Therefore, the report or UI depicted in FIG. 4C shows a percentage of non-viewable impressions for each device under a specific publisher. Similarly, statistics are depicted for Publishers B, C, D, and E. Accordingly, such a report or UI facilitates easy identification of devices, under each publisher, which play the tracked content that cannot be seen by a user of the respective display device or CTV.

In an embodiment, detailed analytics in the form of reports may be generated per publisher and device that provide one or more of: daily share of unviewable impressions for a brand promoter, share of unviewable impressions per publisher, share of unviewable impression per device name, and share of unviewable impressions per publisher and device name.

Figure 5A:
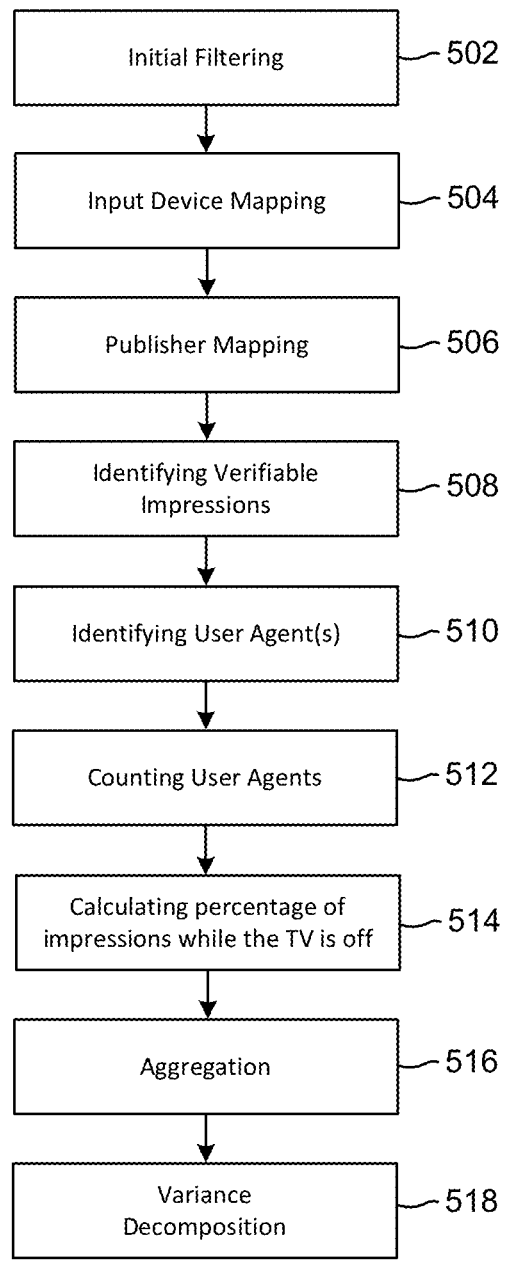
FIG. 5A is a flow chart of an example method of continuous play quantification, according to an embodiment of the present disclosure.

FIG. 5A is a flow chart of an example method of continuous play quantification performed in a pilot study using the techniques disclosed herein. The method involved joining a target company's OTT impressions to a panel of smart TVs, determining whether the impressions are played on a TV in the panel, and then determining the share of impressions when the TV was off, asleep, or tuned to a different channel. The data sources included a TV signal feed, pixel OTT impressions (via, e.g., the iSpot Unified Measurement product), as well as external source OTT impression logs.

Initial Filtering 502

To help minimize the large amount of data involved, only TVs that had at least one pixel OTT impression were included for a given day for the pilot study. It was determined that match rates between impressions and the TV panel tended to be similar with the filtered and unfiltered (all TVs) data, and therefore did not have a large impact on results.

The benefits of having at least one pixel impression included (1) the ability to obtain verification of an input device via the pixel plus the external source's user agent; and (2) reduction of daily datasets from approximately 700 MM rows to approximately 200 MM rows for improved processing speed.

Input Device Mapping 504

In the pilot study, cases were rarely seen where a specified TV-delivered impression was tied to a TV that was turned off and the possibility could not be ruled out that the impression played on another specified TV in the house that wasn't opted-in to the panel. About 2% of the external source's impressions that were delivered on a specified TV were associated with a TV that was off. There were around 20 external input devices identified in the TV signal feed. To the extent possible, user agent information for the external source's and pixel impressions were mapped to these devices.

Approximately 15% of the matched external source's impressions could be mapped to a valid input device (an average of approximately 230,000 impressions per day). Of these, about 15% (33,000) matched the active input device of the specified TV at the same time. Many of the impressions that could not be mapped were tied to phones, tablets, or other mobile devices.

The external source's impressions were mapped to approximately 5% of the daily active TVs (about 146,000) and approximately 4% of the daily IP addresses (about 130,000) represented in the panel.

Publisher Mapping 506

Publishers were determined from a delivery_site field in the external source's logs. The external source provided two documents with publisher mappings, some of which were incomplete and occasionally had 1:many mappings. The 1:many mappings were frequently parent and children brands (e.g., Discovery and TLC).

In the pilot study, mappings from the first document were prioritized. The second document was used to fill in gaps. When a mapping was not available but the delivery site was readable (i.e., not an alpha-numeric code), the publisher was determined based on the delivery site.

When possible, publishers were identified by the app service instead of the specific channel. For example, an identifier like com.sling.laff.ctv.roku would be assigned to SlingTV as the publisher (in this case, the impression was delivered on the Laff channel on the Sling app on a Roku device).

Identifying Verifiable Impressions 508

As detailed below, verifiable impressions were identified through several filtering steps based on the specified TV signal feed active input device, the pixel impression user agent, and the external source's impression user agent.

In the pilot study, the specified TV external input devices were associated with a single OTT user agent. Pixel impressions and external source's impressions that happen at roughly the same time (e.g., within 3 s) on the same type of device would not have different user agents. At least one OTT impression occurred while the TV was on and has the same external input device as the OTT impression. In cases where a verifiable impression was associated with >=2 TVs, and one or more of those TVs was on at the time of the impression, that impression was considered to have been successfully delivered to the TV that was turned on.

Identifying User Agent(s) 510

In one example, identifying user agent(s) only used rows with TV turned on and either a pixel impression and/or an external source impression, where either impression was coming from the same kind of device as the content external input device As a result, the TV had to have at least one verified impression while it was on in order to be included. For example:

If there was only one impression, the UA for that impression was used.

If there were two impressions and the UA was the same for both, the pixel UA was used.

If there were two impressions and the UA was different, the UA for whichever impression came from the same type of external input device as the TV was used.

If neither had the same external input device, the UA was null.

Cases were identified where there were two impressions with different UAs but the same external input device (e.g., both the pixel impression and the external source impression came from an Amazon® device, but their Amazon devices had different UAs).

Count User Agents 512

The method proceeded by counting the number of distinct UAs (as identified in previous step) per external input device and TV. Thereafter, the method continued by filtering for external input devices that had exactly one UA on a given IP address Verifiable Impressions were then identified using the following procedure:

Select all external source's impressions from the TVs and UAs identified in previous step.

This was done in the pilot study by selecting all of the external source impressions that had the same UA from the previous step (join was on the external source's UA, which allowed for capture of impressions in cases where there was no 'selected' UA).

Some cases did not have a selected UA if the mapped impression device was not the same as the specified TV input device, which happens when:
the TV is off (external input device is missing)
the external source's delivery device is not mapped
the external source's delivery device is not the same as the specified TV input device
in the first rounds of analysis, these did not get filtered out
they reflected a very small % of the total impressions, and were associated with a turned on TV
About half of them (approximately 1,000 impressions/day) happened when the specified external input device was correct and the external source device was a different external device. In other words, these may be impressions that are not being seen because the TV is on but tuned to a different input.

If an impression is tied to >1 TV using the previous steps, determine whether at least one TV had content playing at the time of the impression
If yes, select this TV
If more than 1 TV was playing content, select one at random
If none of the TVs were playing content, select one at random Ultimately, the foregoing procedure resulted with each external source impression tied to exactly one TV, giving the benefit of the doubt to TVs that were on.

Calculating Percentage of Impressions while the TV is Off 514

Impressions identified above can occur when a TV is on or off. An impression is associated with a turned-on TV if the impression timestamp falls between the start time and end time of the TV signal feed (i.e., the TV was turned on).

After gathering the impressions as outlined above, the system can count how many occur while the TV is on/off.

Aggregation 516

Percentages of impressions delivered while the TV was off ('unverified impressions') were calculated each day for each input device and each publisher. The following steps were taken to aggregate:

1. Count total verifiable impressions and unverified impressions for all input devices/publishers/device-publisher combinations for each day. Specified TV input devices were excluded.
2. Compute percent missing based on the counts in step 1.
3. Adjust the percentage of unverified impressions based on the corresponding value for specified TV for that day
    a) Theoretically, an impression should not be counted with a specified TV input when the TV is off.
    b) On average, approximately 2% of impressions on a specified TV input are unverified.
    c) When aggregating by input device, subtract the daily specified TV % unverified.
    d) When aggregating by publisher (or publisher+device), subtract the daily specified TV % unverified for that publisher. If a given publisher has not appeared on a specified TV for that day, subtract the total specified TV % unverified for that day (i.e., the same value used for device-level aggregation).
4. Weight the adjusted percentage by the total number of impressions for that day at that level of aggregation (i.e., each publisher is weighted relative to itself over time; each publisher-device combo is weighted relative to itself; etc.).
5. Compute a weighted mean and corresponding standard deviation (SD) and standard error (SE).

Across all days/devices/publishers in the pilot study, an average of 12% (SD=7%)–20% (SD=9%) of impressions were recorded while the TV was off. Full range (across adjusted/unadjusted, conservative/regular, weighted/unweighted) was an average of 7-23%.

Variance Decomposition 518

Variance decomposition was used to determine how much of the variance in unverifiable impressions was due to the input device vs. the publisher. This was specified as a cross-classified model because publishers/input devices are not neatly nested within one another (i.e., one publisher can appear on multiple inputs and one input can have multiple publishers, but not all publishers will show up on all inputs). The model was specified with no predictor variables, only a fixed intercept and the two random intercept terms:

$$\text{percent\_unverified impressions} \sim 1 + (1|\text{publisher}) + (1|\text{input device}) \qquad \text{Eq. 1}$$

Because missingness was assessed daily, models with fixed and random effects for time were also fit. However, missingness was fairly stable across days, and this term did not explain a substantial portion of variance. For simplicity, it was omitted from reported models.

Models were fit in three ways:
1. Across all daily data, ignoring the time component.
2. Across fully aggregated data (i.e., a single % computed for each device—publisher combination).
3. For each day separately.

Models were also fit with and without the following filters:
1. Exclude unverified impressions delivered directly to specified TVs.
2. Minimum 30 days available for each device—publisher combination.
3. Minimum 130 days (⅔ of total) available for each device—publisher combination.
4. Total impressions for each device—publisher combination>=median impressions.

Across all of these variations, input devices and publishers accounted for basically the same amount of variance, with devices getting a slight edge in some cases (especially in the aggregated models, which sum impressions across the whole 6.5-month period).

Averages across all filtering options shown below in Table 1.

TABLE 1

|  | Device % | Publisher % |
| --- | --- | --- |
| Aggregated | 35% (SD = 14%) | 21% (SD = 10%) |
| Disaggregated | 16% (SD = 5%) | 14% (SD = 8%) |
| Daily | 18% (SD = 12%) | 17% (SD = 15%) |

Note that the remaining variance (up to 100%) is unexplained/error variance. The total amount of variance explained (device+publisher) may vary based on the model specification. For example, the aggregated model explains, on average, 56% of the variance in impressions recorded while the TV was off. The disaggregated 'regular' model explains 30% of the variance. This is likely because the aggregated model collapses across days and so has less variability in general than the disaggregated model.

For the strictest filter that is available across all three types of modes (the device-publisher combo had to be above the total or daily median number of impressions and no specified TVs were included), publishers accounted for 11%-33% of the variance, and devices accounted for 12%-63%.

Figure 5B:
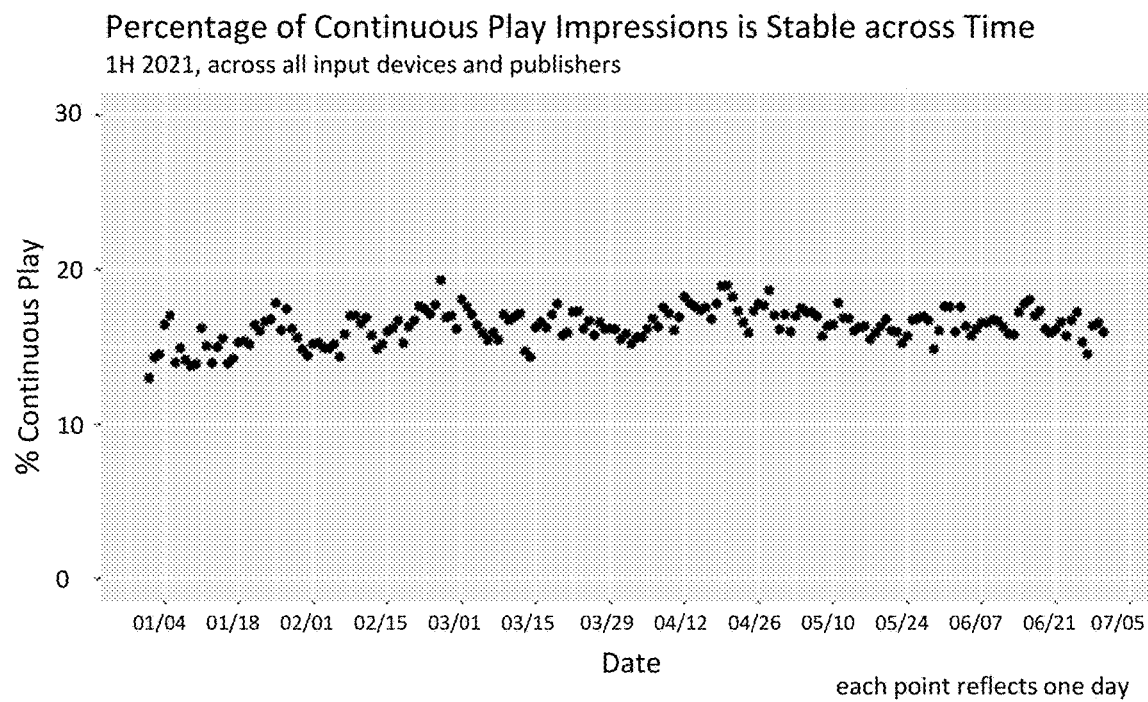
FIGS. 5B-5D are graphs of continuous play data according to embodiments of the present disclosure.

FIG. 5B is a graph of continuous play events over time for the 6-month period of the pilot study. The result of the analysis is that 15-20% of CTV impressions delivered via connected devices cannot be seen. In addition, the graph illustrates that percentage of continuous play impressions was stable a 6-month period validating that continuous play events are a persistent problem.

Figure 5C:
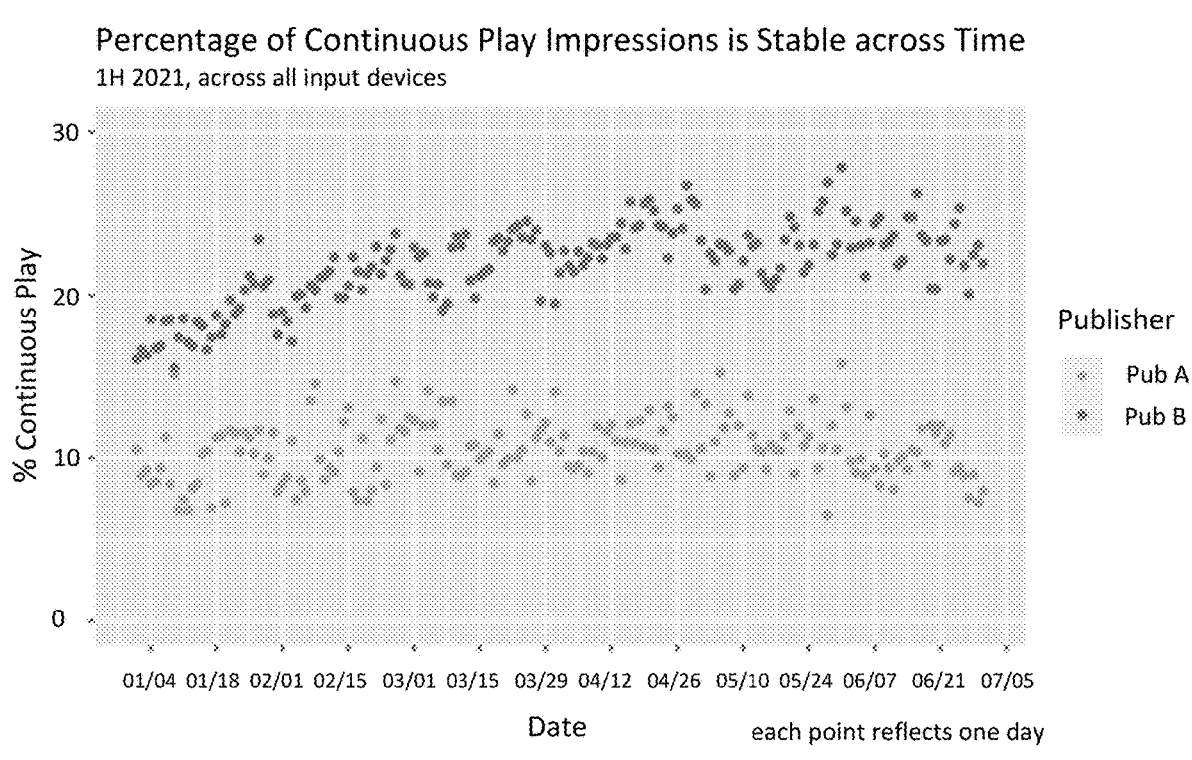

FIG. 5C is a graph comparing continuous play events over time with respect to two different publishers. Pub. A and Pub. B account for 34% and 8% of all impressions, respectively. Pub. B has a constantly high incidence rate of non-delivered impressions (M=22%, SD=4.9%). Pub. A has a consistently low incidence rate (M=11%, SD=4.2%).

Figure 5D:
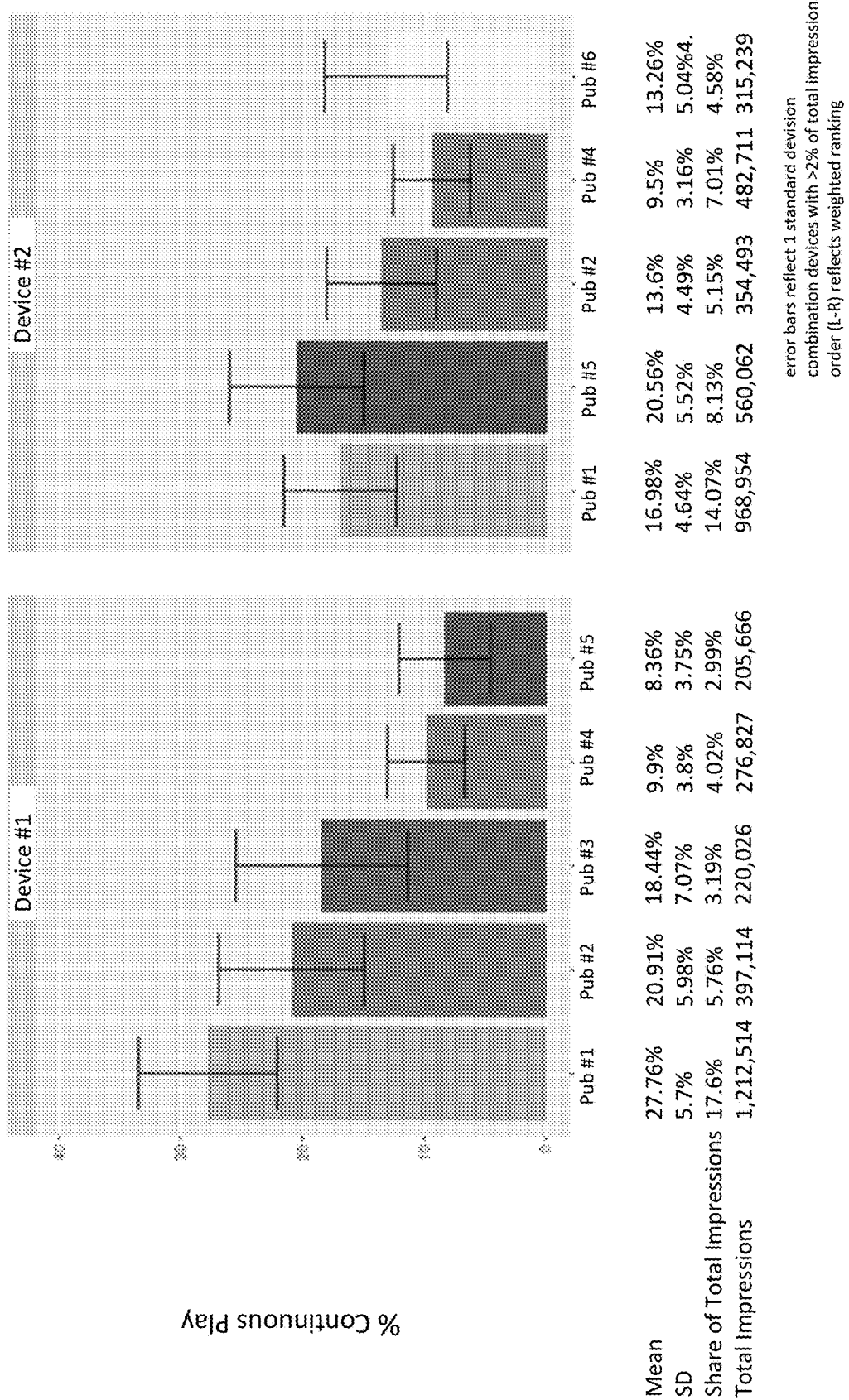

FIG. 5D includes two graphs of average continuous play percentages for two platforms (Platform X and Platform Y). The graph illustrates that the same app behaves differently on different platforms, indicative of a lack of standards among implementations and signals to stop streaming.

Figure 5E:
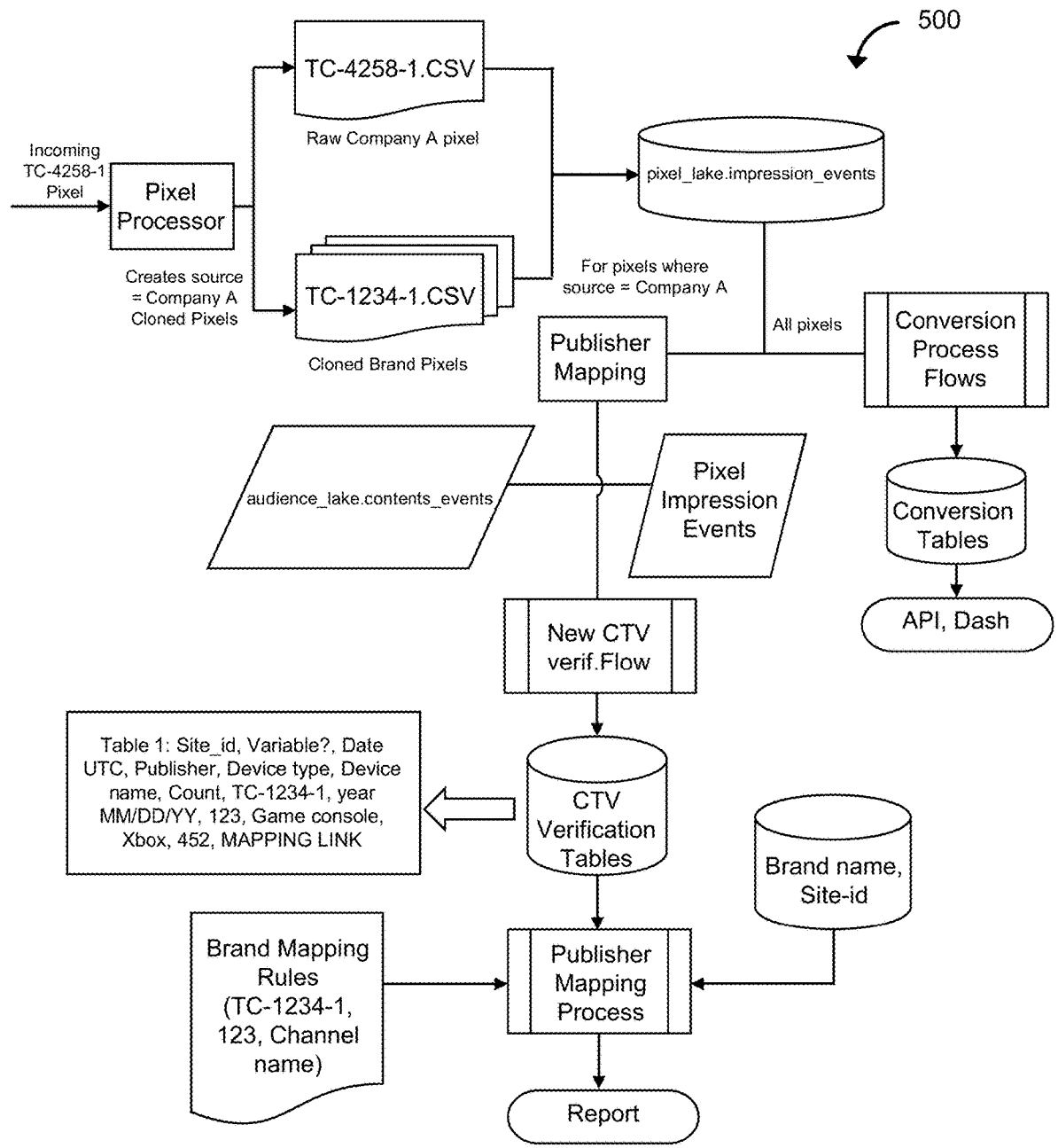
FIG. 5E illustrates a data flow diagram depicting a methodology for detecting continuous play events, according to an embodiment of the present disclosure.

FIG. 5E illustrates a data flow diagram 500 depicting a methodology for detecting continuous play events, according to an embodiment of the present disclosure. The methodology is depicted in FIG. 5 in conjunction with the terms and concepts described with respect to previous figures. For instance, pixel_lake.impression_events in the data flow diagram 500 correspond to the content impression feed 206 and audience_lake.content_events correspond to the device status feed 202.

The data flow diagram 500 depicts processing server logs for the tracked content provided by brand promoters and matching them to a panel, which includes panel data or device status feed 202 of the plurality of displays devices or TVs as discussed previously. The matching is performed to confirm whether the tracked content was viewable on a screen by user(s). In particular, the methodology depicted in the data flow diagram 500 involves joining content impressions determined by processing the server logs to the panel, determining whether the content impressions played on a TV in the panel, and then determining a frequency of impressions when the TV was off.

Figure 6:
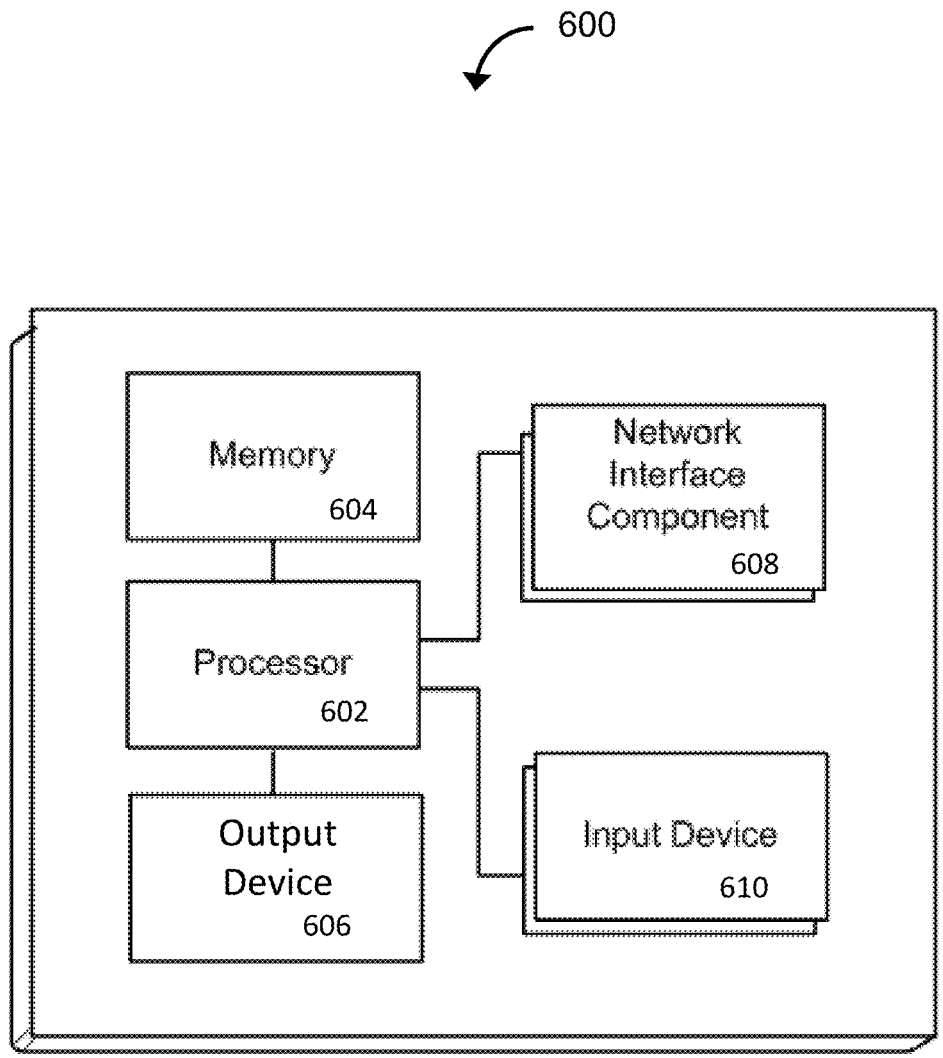
FIG. 6 illustrates an example of a computing system for implementing a method that detects the continuous play event, according to an embodiment of the present disclosure.

FIG. 6 illustrates an example of a computing system 600 for implementing a method that detects a continuous play event, according to an embodiment of the present disclosure. The computing system 600 includes one or more computerized devices, where each computerized device can include hardware elements that may be electrically coupled via a bus, the elements include at least one processor 602, e.g., central processing unit (CPU) or processing unit, which is communicatively coupled to other elements of the computing system 600 such as a memory 604, an output device 606, a network interface component 608, and an input device 610. The processor 602 can include any general-purpose processor as well as a special-purpose processor where software instructions are incorporated into the actual processor design. The processor 602 may essentially be a completely self-contained computing system, containing multiple cores or processors, a bus, a memory controller, a cache, etc. A multi-core processor may be symmetric or asymmetric.

The memory 604 may include one or more storage devices, such as disk drives, optic storage devices, and solid-state storage devices such as random-access memory ("RAM") or read-only memory ("ROM"), as well as removable media devices, memory cards, flash cards, etc. The memory 604 may also be a storage media and a computer readable media that contains program code, or portions of program code, can include any appropriate media known or used in the art. The storage media and communication media are, but not limited to, volatile and non-volatile, removable and non-removable media implemented in any method or disclosure for storage and/or transmission of information such as computer readable instructions, data structures, program modules, or other data, including RAM, ROM, EEPROM, flash memory or other memory disclosure, CD-ROM, digital versatile disk (DVD) or other optic storage, magnetic cassettes, magnetic tape, magnetic disk storage or other magnetic storage devices, or any other medium which can be used to store the desired information and which can be accessed by a system device or the processor 602.

The storage media may be coupled to other devices of the computing system 600, such as a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information.

An environment including the computing system 600 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate.

The computing system 600 includes at least one input device 610 (e.g., a mouse, keyboard, controller, touch screen, or keypad), and at least one output device 606 (e.g., a display device, printer, or speaker). The network interface component 608 supports communication between the computing system 600 other external systems or devices. Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In an embodiment, the computerized device includes a Web server (not shown), the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The computing system 600 and various devices also typically will include a number of software applications, modules, services, or other elements located within at least one working memory device, including an operating system and application programs, such as a client application or Web browser. It should be appreciated that alternative embodiments may have numerous variations from that described above. For example, customized hardware might also be used and/or particular elements might be implemented in hardware, software (including portable software, such as applets), or both. Further, connection to other computing devices such as network input/output devices may be employed.

The systems and methods described herein can be implemented in hardware, software, firmware, or combinations of hardware, software and/or firmware. In some examples, systems described in this specification may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

What is claimed is:

1. A computer-implemented method for accurately determining viewership of tracked content, the method comprising:
    receiving, via a processor, a device status feed including, for each of a plurality of content player devices:
        at least one of a power status indicating whether a display device for a content player device of the plurality of content player devices is powered on or an active input status indicating whether the display device is tuned into an input connected to the content player device;
        a time associated with the at least one of the power status or the active input status; and
        an identifier associated with the content player device that distinguishes the content player device among the plurality of content player devices;
    receiving, via the processor, a content impression feed including, for each of a plurality of content impressions generated by the plurality of content display devices:
        a time associated with a content impression of the plurality of content impressions indicating when particular tracked content has been played by a particular content player device; and
        an identifier associated with the content impression that distinguishes the content impression among the plurality of content impressions;
    matching, via the processor, respective content impressions in the content impression feed to respective content player devices in the device status feed by the identifiers in the device status feed and the content impression feed; and
    detecting, via the processor, at least one continuous play event in response, at least in part, to the display device for a first content display device being powered off according to the power status or not tuned to the input connected to the first content player device according to the active input status at or near the time associated with the respective content impression, such that the respective content impression associated with the at least one continuous play event is not used in determining the viewership of the tracked content.

2. The computer-implemented method of claim 1, further comprising:
    reporting, via the processor, the continuous play event.

3. The computer-implemented method of claim 1, further comprising:
    receiving, via the processor, device status feeds for a plurality of display devices;
    receiving, via the processor, content impression feeds for a plurality of content impressions;
    detecting, via the processor, continuous play events for at least a subset of the plurality of display devices and plurality of content impressions; and
    reporting, via the processor, statistics for the detected continuous play events.

4. The computer-implemented method of claim 3, wherein the statistics include at least one of a percentage of content impressions in which the display device was turned off, a total number of content impressions in which the display device was turned off, a percentage of content impressions in which the display device was not tuned to the input connected to the content player device, or a total number of content impressions in which the display device was turned off.

5. The computer-implemented method of claim 4, wherein each content impression has a particular publisher, and wherein the statistics are reported on a per publisher basis.

6. The computer-implemented method of claim 4, wherein each content impression is part of a particular campaign, and wherein the statistics are reported on a per campaign basis.

7. The computer-implemented method of claim 1, wherein the content impression is generated in response to rendering a reference embedded in the tracked content played by the content player device.

8. The computer-implemented method of claim 7, wherein the reference comprises an invisible image.

9. The computer-implemented method of claim 1, wherein the time associated with the power status or the time associated with the active input status corresponds to a particular time range, such that a continuous play event is detected in response, at least in part, to the display device being powered off according to the power status or not tuned to the input connected to the content player device according to the active input status within the particular time range.

10. A system comprising:
a processor;
a network interface; and
a memory including program code that, when executed by the processor, causes the processor to perform operations for accurately determining viewership of tracked content, the operations including:
  receiving, through the network interface, a device status feed including, for each of a plurality of content player devices:
    at least one of a power status indicating whether a display device for a content player device of the plurality of content player devices is powered on or an active input status indicating whether the display device is tuned into an input connected to the content player device;
    a time associated with the at least one of the power status or the active input status; and
    an identifier associated with the content player device that distinguishes the content player device among the plurality of content player devices;
  receiving, through the network interface, a content impression feed including, for each of a plurality of content impressions generated by the plurality of content display devices:
    a time associated with a content impression of the plurality of content impressions indicating when particular tracked content has been played by a particular content player device; and
    an identifier associated with the content impression that distinguishes the content impression among the plurality of content impressions;
  matching respective content impressions in the content impression feed to the respective content player devices in the device status feed by the identifiers in the device status feed and the content impression feed; and
  detecting at least one continuous play event in response, at least in part, to the display device for a first content display device being powered off according to the power status or not tuned to the input connected to the first content player device according to the active input status at or near the time associated with the respective content impression, such that the respective content impression associated with the at least one continuous play event is not used in determining the viewership of the tracked content.

11. The system of claim 10, the operations further comprising:
reporting the continuous play event.

12. The system of claim 10, the operations further comprising:
receiving device status feeds for a plurality of display devices;
receiving content impression feeds for a plurality of content impressions; detecting continuous play events for at least a subset of the plurality of display devices and plurality of content impressions; and
reporting statistics for the detected continuous play events.

13. The system of claim 12, wherein the statistics include at least one of a percentage of content impressions in which the display device was turned off, a total number of content impressions in which the display device was turned off, a percentage of content impressions in which the display device was not tuned to the input connected to the content player device, or a total number of content impressions in which the display device was turned off.

14. The system of claim 13, wherein each content impression has a particular publisher, and wherein the statistics are reported on a per publisher basis.

15. The system of claim 13, wherein each content impression is part of a particular campaign, and wherein the statistics are reported on a per campaign basis.

16. The system of claim 10, wherein the content impression is generated in response to rendering a reference embedded in the tracked content played by the content player device.

17. The system of claim 16, wherein the reference comprises an invisible image.

18. The system of claim 10, wherein the time associated with the power status or the time associated with the active input status corresponds to a particular time range, such that a continuous play event is detected in response, at least in part, to the display device being powered off according to the power status or not tuned to the input connected to the content player device according to the active input status within the particular time range.

19. A non-transitory computer readable medium comprising program code that, when executed by a processor, perform operations for accurately determining viewership of tracked content, the operations comprising:
receiving a device status feed including, for each of a plurality of content player devices:
  at least one of a power status indicating whether a display device for a content player device of the plurality of content player devices is powered on or an active input status indicating whether the display device is tuned into an input connected to the content player device;
  a time associated with the at least one of the power status or the active input status; and
  an identifier associated with the content player device that distinguishes the content player device among the plurality of content player devices;
receiving a content impression feed including, for each of a plurality of content impressions generated by the plurality of content display devices:
  a time associated with a content impression of the plurality of content impressions indicating when particular tracked content has been played by a particular content player device; and an identifier associated with the content impression that distinguishes the content impression among the plurality of content impressions;

matching respective content impressions in the content impression feed to each respective content player devices in the device status feed by the identifiers in the device status feed and the content impression feed; and detecting at least one continuous play event in response, at least in part, to the display device for a first content display device being powered off according to the power status or not tuned to the input connected to the first content player device according to the active input status at or near the time associated with the respective content impression, such that the respective content impression associated with the at least one continuous play event is not used in determining the viewership of the tracked content.

\* \* \* \* \*